United States Patent
Wenger et al.

(10) Patent No.: US 10,590,939 B2
(45) Date of Patent: Mar. 17, 2020

(54) FLUID PUMP ASSEMBLY

(71) Applicant: Tuthill Corporation, Fort Wayne, IN (US)

(72) Inventors: Matthew Wenger, Fort Wayne, IN (US); Nicholas G. Till, Fort Wayne, IN (US); Wayne A. Hughes, Jr., Fort Wayne, IN (US); Jacob J. Berry, Uniondale, IN (US); Lester B. Ashe, Fort Wayne, IN (US)

(73) Assignee: Tuthill Corporation, Fort Wayne, IN (US)

( * ) Notice: Subject to any disclaimer, the term of this patent is extended or adjusted under 35 U.S.C. 154(b) by 105 days.

(21) Appl. No.: 15/958,217

(22) Filed: Apr. 20, 2018

(65) Prior Publication Data
US 2019/0323512 A1    Oct. 24, 2019

(51) Int. Cl.
  *F04D 25/08* (2006.01)
  *F04D 13/06* (2006.01)
  *F04D 29/58* (2006.01)

(52) U.S. Cl.
  CPC ....... *F04D 25/082* (2013.01); *F04D 13/0646* (2013.01); *F04D 29/584* (2013.01); *F04D 29/5806* (2013.01)

(58) Field of Classification Search
  CPC .. H02K 9/00; H02K 9/04; H02K 9/14; H02K 9/20; H02K 5/00; H02K 5/04; H02K 5/13; H02K 5/136; H02K 5/18; F04D 29/00; F04D 29/40; F04D 29/58; F04D 29/58; F04D 29/5806; F04D 29/584; F04D 25/00; F04D 25/08; F04D 25/082; F04D 13/00; F04D 13/06; F04D 13/064; F04D 13/0646; F04C 15/00; F04B 53/00; F04B 53/16; F02M 37/00
  See application file for complete search history.

(56) References Cited

U.S. PATENT DOCUMENTS 4,013,383 A * 3/1977 Rule ............... F04D 9/001
                                            417/366
4,931,678 A    6/1990 Lutz
5,810,568 A * 9/1998 Whitefield ............ F04C 11/008
                                            417/410.3
(Continued)

FOREIGN PATENT DOCUMENTS

CN    201610430749.9    8/2016
GB    2 303 972 A       5/1997
WO    WO 2014/116576 A1 7/2014

OTHER PUBLICATIONS

Partial European Search Report (R. 64 EPC); dated Jul. 24, 2019.
(Continued)

*Primary Examiner* — Tran N Nguyen
(74) *Attorney, Agent, or Firm* — Barnes & Thornburg LLP

(57) ABSTRACT

A fluid transfer pump assembly that includes a motor enclosure assembly that forms a motor cavity sized to receive a motor. The motor enclosure includes a flame path that extends from an interior joint to an exterior joint. The interior joint faces the motor cavity and the exterior joint faces exterior of the motor enclosure assembly. A heat sink is located in the motor cavity of the motor enclosure assembly. A portion of the heat sink abuts the interior joint.

20 Claims, 9 Drawing Sheets

(56) References Cited

U.S. PATENT DOCUMENTS

| | | | | |
|---|---|---|---|---|
| 5,930,852 | A * | 8/1999 | Gravatt | F04D 13/06 |
| | | | | 4/493 |
| 6,091,174 | A | 7/2000 | Genster | |
| 6,663,362 | B1 * | 12/2003 | Lentz | H02K 1/145 |
| | | | | 310/253 |
| 7,036,892 | B2 * | 5/2006 | Suzuki | F04C 2/102 |
| | | | | 303/116.4 |
| 9,337,707 | B2 | 5/2016 | Dixon | |
| 9,825,561 | B2 | 11/2017 | Dixon | |
| 2004/0037719 | A1 * | 2/2004 | Sunaga | F04D 13/064 |
| | | | | 417/423.8 |
| 2014/0210321 | A1 | 7/2014 | Dixon et al. | |
| 2016/0084145 | A1 * | 3/2016 | Fulton | F04D 15/0022 |
| | | | | 415/118 |

OTHER PUBLICATIONS

Hobbywing, Ezrun, Max 8 Brushless Electronic Speed Controller, User Manual, Jan. 6, 2016.
Associated Electrics, Inc., XP Digital, XPSC450-BL Brushless Electronic Speed Control Manual.

* cited by examiner

FLUID PUMP ASSEMBLY

TECHNICAL FIELD AND SUMMARY

The present disclosure is related to fluid transfer pump assemblies, and particularly to such pump assemblies that have heat dissipation, status feedback signals, and switching functionality in explosion-proof motor enclosure environments.

Fluid transfer pumps move fluid from one location to another. One example includes a pump that moves hazardous fluid such as gasoline from a storage tank to a vehicle. The pump may employ vanes, diaphragms, or other like structures that are rotated or oscillated inside the pump via some motive force such as an electric motor. The vanes are located in a pump enclosure that is in fluid communication with inlet and outlet manifolds. The inlet manifold may also be in communication with the gasoline in the storage tank while the outlet manifold may also be attached to a hose or other structure configured to deliver the gasoline to another location. As the motor rotates the vanes, a vacuum is created in the pump enclosure to cause the gasoline already present in the tank to be drawn up through the inlet manifold. The vanes then rapidly push the gasoline out through the outlet manifold and the hose, to be delivered to the other location. A nozzle or other type of valve structure may be attached at the other end of the hose to selectively dispense the pumped gasoline.

An electric motor is a suitable means for rotating the vanes inside the pump. The motor is also able to generate enough rotational velocity to effectively draw up and dispense the fluid at a sufficient rate.

Fluids like gasoline, however, may pose a risk when utilizing electric motors since such motors have a propensity to produce heat, sparks and arcs, and even flames during abnormal conditions. Placing such motors in potentially flammable environments can, therefore, be hazardous. That is why electric motors are housed in explosion-proof enclosures. These enclosures prevent any internal explosion from propagating to a surrounding explosive atmosphere.

One manner of mitigating explosions that occur inside the motor enclosure from propagating to outside the motor enclosure is to provide a flame path at the joint between the motor enclosure and end bell. The flame path may be an extended seam located at the motor enclosure joint where the motor enclosure and end bell couple to each other. Illustratively, the end bell may include an extended flange sized to fit against an elongated collar on the motor enclosure. The result is a pathway located between the spaced-apart interior and exterior seams of the enclosure and end bell. The space between the extended flange and collar provides a pathway that will extinguish any flames generated by an explosion inside the enclosure. This prevents the explosion from reaching the external explosive environment thereby eliminating risk of igniting any flammable concentration of vapors outside of the enclosure.

As the skilled artisan will appreciate, creating these flame paths adds expense and complexity to the motor enclosure and, thus, the pump as a whole. Further exacerbating the issue is if any additional ports or openings are needed. In these instances another flame path will be needed for each additional opening. In other words, more openings in the motor enclosure means more flame paths which means more cost.

Illustrative embodiments of this present disclosure provide multiple solutions for operating and enhancing the fluid pump motor located inside the explosion-proof motor enclosure, but without needing additional openings requiring additional flame paths, and, thus, additional costs.

An illustrative embodiment of the present disclosure includes an explosion-proof motor enclosure that comprises a heat sink for efficiently transferring heat generated by components located within the enclosure, but without requiring openings in the enclosure. Another illustrative embodiment of the present disclosure comprises a status feedback signal system that conveys operating conditions of the motor, again, without requiring additional openings extend through the motor enclosure. Another illustrative embodiment of the present disclosure provides a switch system to activate and deactivate the electric motor. And yet again, this is accomplished without requiring additional openings in the motor enclosure.

Another illustrative embodiment of the present disclosure provides a fluid transfer pump assembly comprising: a motor enclosure assembly formed by a motor enclosure and an end bell; wherein the motor enclosure and the end bell join together to form a motor cavity sized to receive a motor; wherein the motor enclosure includes a collar that extends from the motor enclosure at a collar base, encircles a portion of the motor cavity, and terminates at a collar end distal from the collar base; wherein the collar includes a collar surface; wherein the end bell includes a flange that extends from the end bell at a flange base, encircles a portion of the motor cavity, and terminates at a flange end distal from the flange base; wherein the flange includes a flange surface; wherein when the motor enclosure and the end bell are joined together to form the motor cavity the collar surface faces the flange surface to form a flame path between the collar and flange surfaces; wherein when the motor enclosure and the end bell are joined together to form the motor cavity the collar base is located adjacent the flange end to form an interior-only joint that faces the motor cavity but not located exterior of the motor enclosure assembly; wherein when the motor enclosure and the end bell are joined together to form the motor cavity the flange base is located adjacent the collar end to form an exterior-only joint that is located exterior of the motor cavity but does not face the motor cavity; wherein the flame path extends from the interior-only joint to the exterior-only joint; a heat sink composed of a panel positionable at the interior-only joint of the motor enclosure assembly; wherein the panel of the heat sink has a first surface, a perimeter surface, and a second surface such that the second surface is located adjacent the perimeter surface and opposite the first surface; and a heat generating power conversion circuit board that is attachable to the panel of the heat sink at a location selected from the group consisting of the first surface and the second surface; wherein a portion of the first surface of the panel of the heat sink abuts the collar base at the interior-only joint; wherein a portion of the second surface of the panel of the heat sink abuts the flange end at the interior-only joint; and wherein the perimeter surface of the panel of the heat sink does not interfere with the flame path extending from the interior-only joint to the exterior-only joint of the motor enclosure assembly.

In the above and other illustrative embodiments, the fluid transfer pump assembly may further comprise: the motor cavity being cylindrical, the collar surface of the motor enclosure being cylindrical, and the flange surface of the end bell being cylindrical; the panel of the heat sink having a circular shape such that the end surface of the panel of the heat sink is located adjacent the cylindrical collar surface of the motor enclosure; the panel of the heat sink is located only interior of the motor enclosure assembly wherein no portion of the heat sink extends exterior of the motor enclosure assembly, and wherein no vents in the motor enclosure assembly are configured to dissipate heat from the heat-generating power conversion circuit board; a pump enclosure attached to the motor enclosure assembly; and the motor enclosure and end bell are both made of a heat-conducting material.

Another illustrative embodiment of the present disclosure provides a fluid transfer pump assembly comprising: a motor enclosure assembly that forms a motor cavity sized to receive a motor; wherein the motor enclosure includes a flame path composed of a pathway formed by two facing surfaces of the motor enclosure; wherein the pathway is formed by the two facing surfaces of the motor enclosure that extend from an interior joint to an exterior joint; wherein the interior joint faces the motor cavity and the exterior joint faces exterior of the motor enclosure assembly; and a heat sink located in the motor cavity of the motor enclosure assembly; wherein a portion of the heat sink abuts the interior joint; and wherein the heat sink does not interfere with the flame path extending from the interior joint to the exterior joint of the motor enclosure assembly.

In the above and other illustrative embodiments, the fluid transfer pump assembly may further comprise: the motor enclosure assembly being composed of a first motor enclosure portion and a second motor enclosure portion; the first motor enclosure portion includes a first facing surface of the two facing surfaces, and the second motor enclosure portion includes a second facing surface of the two facing surfaces; the interior joint includes a first joint surface of the first motor enclosure portion and a second joint surface of the second motor enclosure surface; the portion of the heat sink that abuts the interior joint contacts both the first and second joint surfaces such that heat in the heat sink transfers to the first and second motor enclosure portions; the interior joint encircles the motor cavity, a cross-sectional profile of the motor cavity is circular, square, oval, quadrilateral, and polygonal; the first and second motor enclosure portions are separable; the portion of the heat sink that abuts the interior joint includes a periphery that extends about the perimeter of the heat sink; the periphery abuts the interior joint of the motor enclosure assembly; a heat generating power conversion circuit board is attachable to the heat sink and transfers heat to the heat sink.

Another illustrative embodiment of the present disclosure provides a fluid transfer pump assembly comprising: a motor enclosure assembly that forms a motor cavity sized to receive a motor; wherein the motor enclosure includes a flame path; wherein the flame path extends from an interior joint to an exterior joint; wherein the interior joint faces the motor cavity and the exterior joint faces exterior of the motor enclosure assembly; and a heat sink located in the motor cavity of the motor enclosure assembly; wherein a portion of the heat sink abuts the interior joint; and wherein no portion of the heat sink extends exterior to the motor enclosure assembly.

In the above and other illustrative embodiments, the fluid transfer pump assembly may further comprise: the heat sink does not interfere with the flame path that extends from the interior joint to the exterior joint; the motor cavity including a motor controller that supplies power to a motor having a rotor and a stator, wherein the stator includes a plurality of pole pairs of wire windings that create a moving electromagnetic force to rotate the rotor, wherein the motor controller upon receiving signals of a condition of the motor, directs current to at least one pole pair of wire windings at a voltage that does not cause the motor to rotate, but causes the at least one pole pair of wire windings to vibrate to create a status feedback signal; and the motor cavity includes a switch assembly that comprises at least one magnet located on a shield extending transverse from that magnet, a switch actuator located adjacent to the shield opposite the at least one magnet, wherein the switch is engageable with the magnet through the shield such that as the switch actuator moves the magnet moves, wherein the magnet fits into a space on the motor enclosure that is spaced apart from the motor cavity in the motor enclosure, a magnetic field sensor located inside the motor cavity of the motor enclosure assembly and isolated from exterior of the motor enclosure cavity, wherein the magnetic field sensor is in electric communication with a motor controller to selectively supply current to the motor to operate same, wherein the magnetic field sensor produces a signal when it detects a magnetic field of a predefined characteristic generated by the magnet. Illustratively, the motor controller interprets the signal generated by the magnetic field sensor and acts to switch on/off based on predefined parameters.

Additional features and advantages of the fluid transfer pump assembly will become apparent to those skilled in the art upon consideration of the following detailed descriptions exemplifying the best mode of carrying out the fluid transfer pump assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
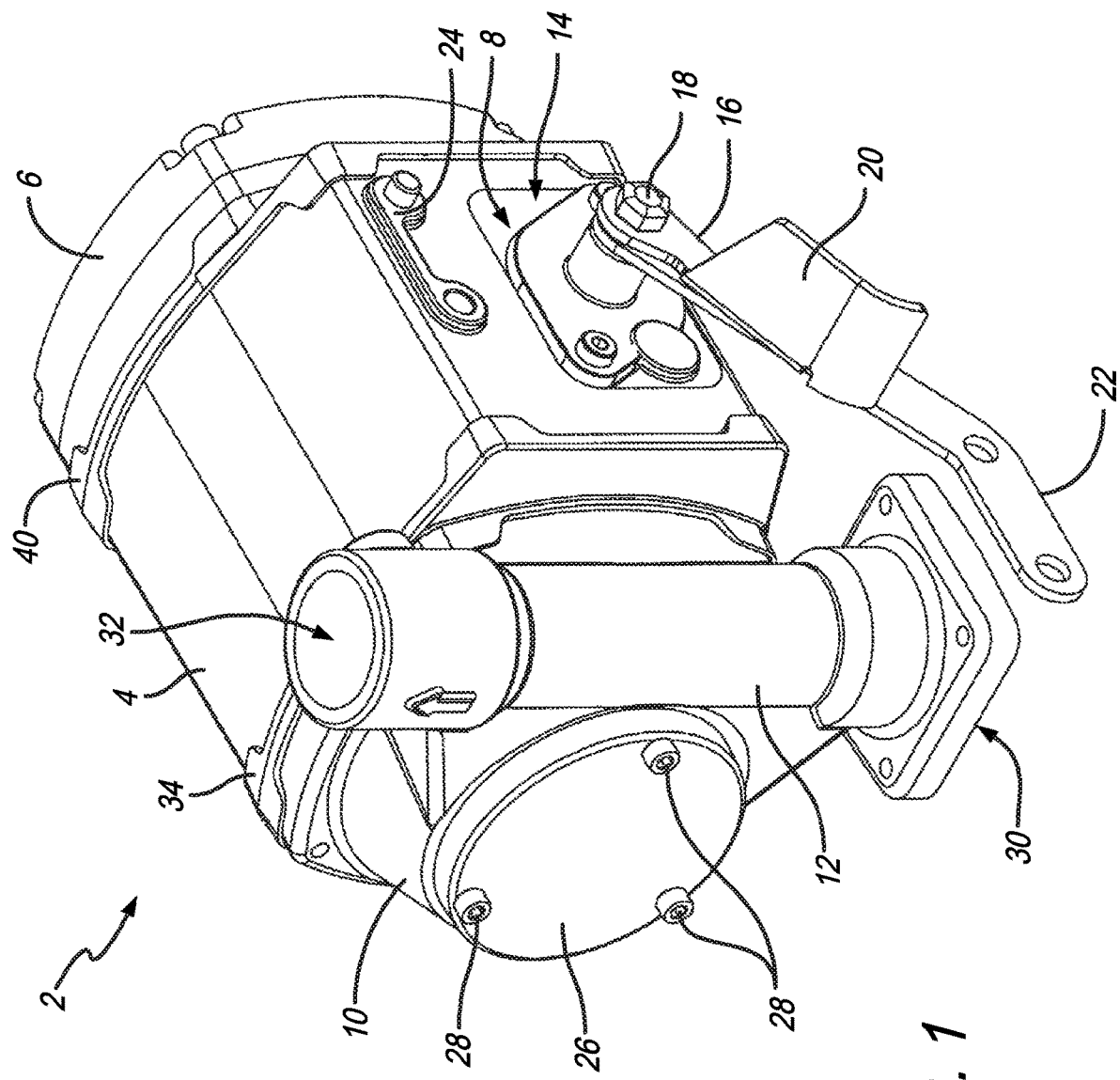
FIG. 1 is a front perspective view of a fluid pump assembly according to an illustrative embodiment of the present disclosure.

Corresponding reference characters indicate corresponding parts throughout the several views. The exemplification set out herein illustrates an embodiment of the fluid transfer pump assembly, in one form, and such exemplification is not to be construed as limiting the scope of the fluid transfer pump assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 7:
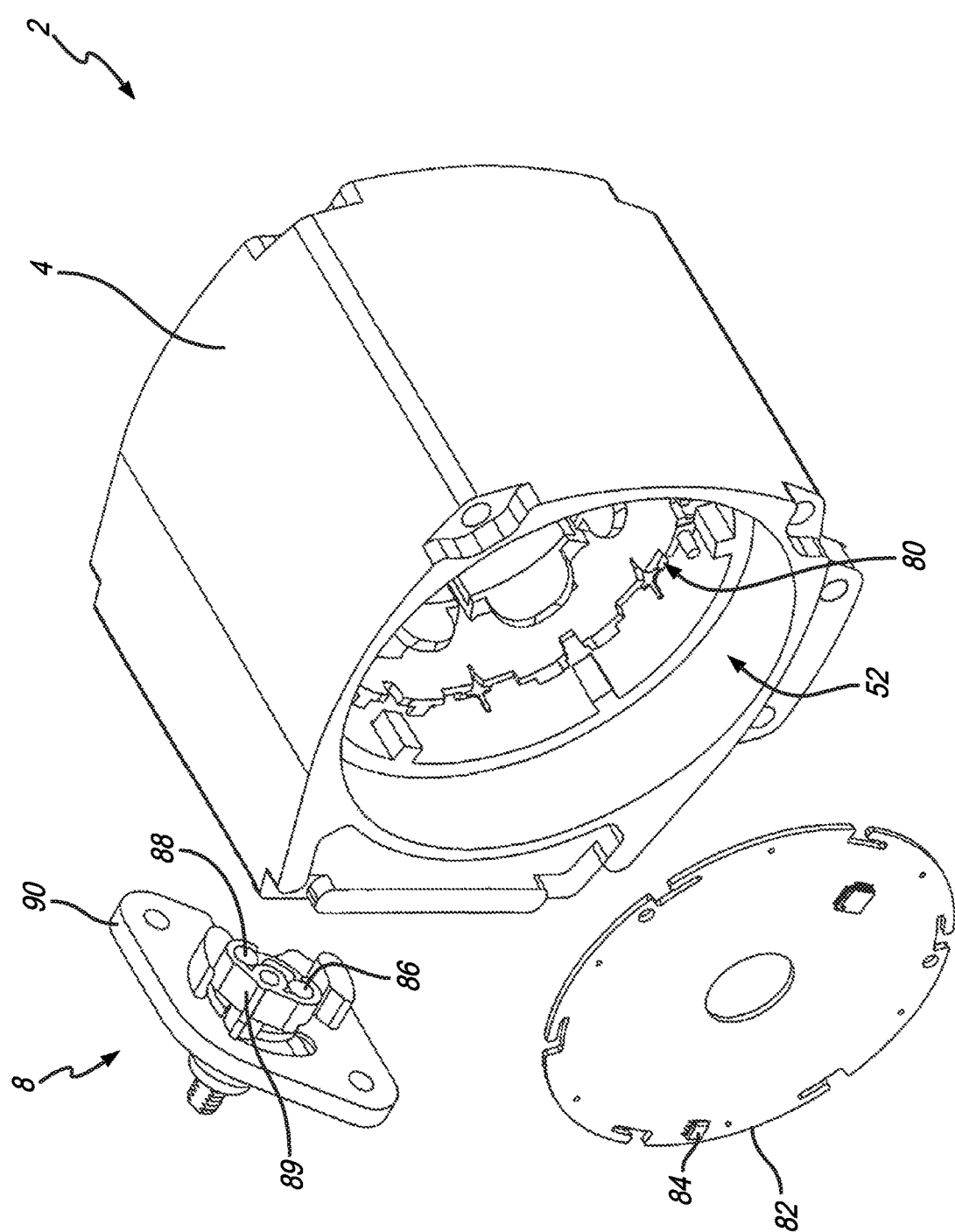
FIG. 7 is a perspective exploded detail view of the switch assembly, motor enclosure, and motor controller board components of the fluid transfer pump assembly.
Figure 8:
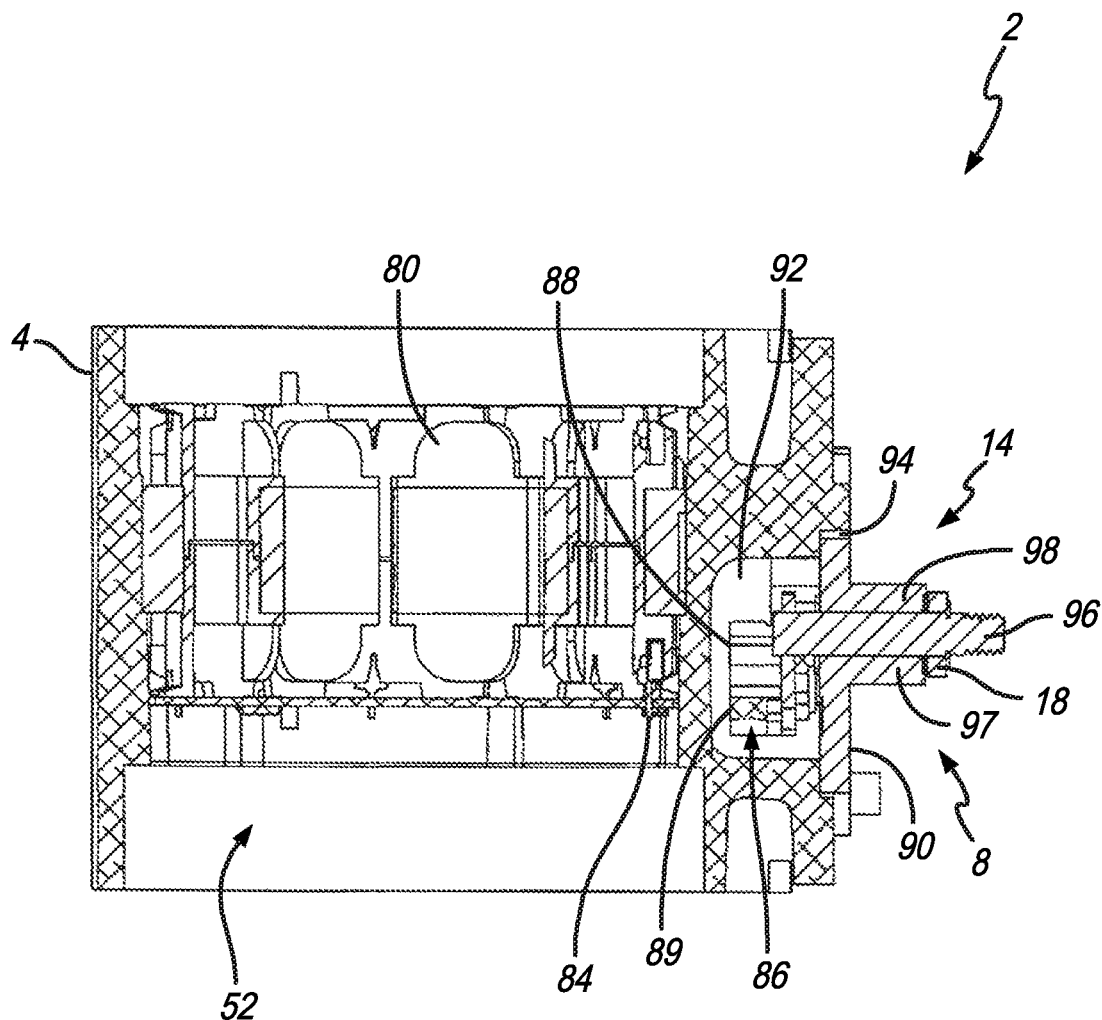
FIG. 8 is a top downward looking cross-sectional view of a portion of the fluid transfer pump assembly.

A front perspective view of illustrative pump assembly 2 is shown in FIG. 1. As shown, fluid transfer pump 2 includes a motor enclosure 4, rear end bell 6, switch mechanism 8, pump enclosure 10, and manifolds 12. Motor enclosure 4 is part of an explosion-proof enclosure along with end bell 6 and pump enclosure 10 which prevents any sparks, arcs, and flames, from exiting the motor enclosure 4, rear end bell 6, and pump enclosure 10. Switch mechanism 8, which will be discussed in further detail with respect to FIGS. 7 through 9, is illustratively positioned on the exterior of motor enclosure 4 as shown. In the illustrated embodiment, switch mechanism 8 is shown having a switch shaft assembly 14 attached to switch lever arm 16 via fastener 18. Illustratively, a switch lever handle 20 attached to switch lever arm 16 assists in operating switch mechanism 8. Further, locking portion 22 allows padlocks or other securing structures to secure the nozzle to the pump (not shown). Also shown is a nozzle hanger mount 24. It will be appreciated by the skilled artisan that fluid transfer pump 2 may be configured to pump gasoline or other like hazardous materials in a similar manner to conventional gas station pumps. Particularly, gas dispensing nozzles (not shown) may be employed with the fluid transfer pump 2 and operate in a similar method as their gas station fuel pump nozzle counterpart.

Also shown in this view is pump enclosure 10 located adjacent motor enclosure 4 and capped with a rotor cover 26 via fasteners 28. In this illustrative embodiment, pump enclosure 10 encloses a rotor and vanes that are rotated by an electric motor located in motor enclosure 4. The rotating vanes to draw up and expel fluid from inlet manifold portion 30 and out through outlet manifold portion 32. Also shown are aesthetic joint covers 34 and 36. These covers illustratively shroud the explosion-proof joints that exist between motor enclosure 4 and rear end bell 6, as well as motor enclosure 4 and pump enclosure 10.

Figure 2:
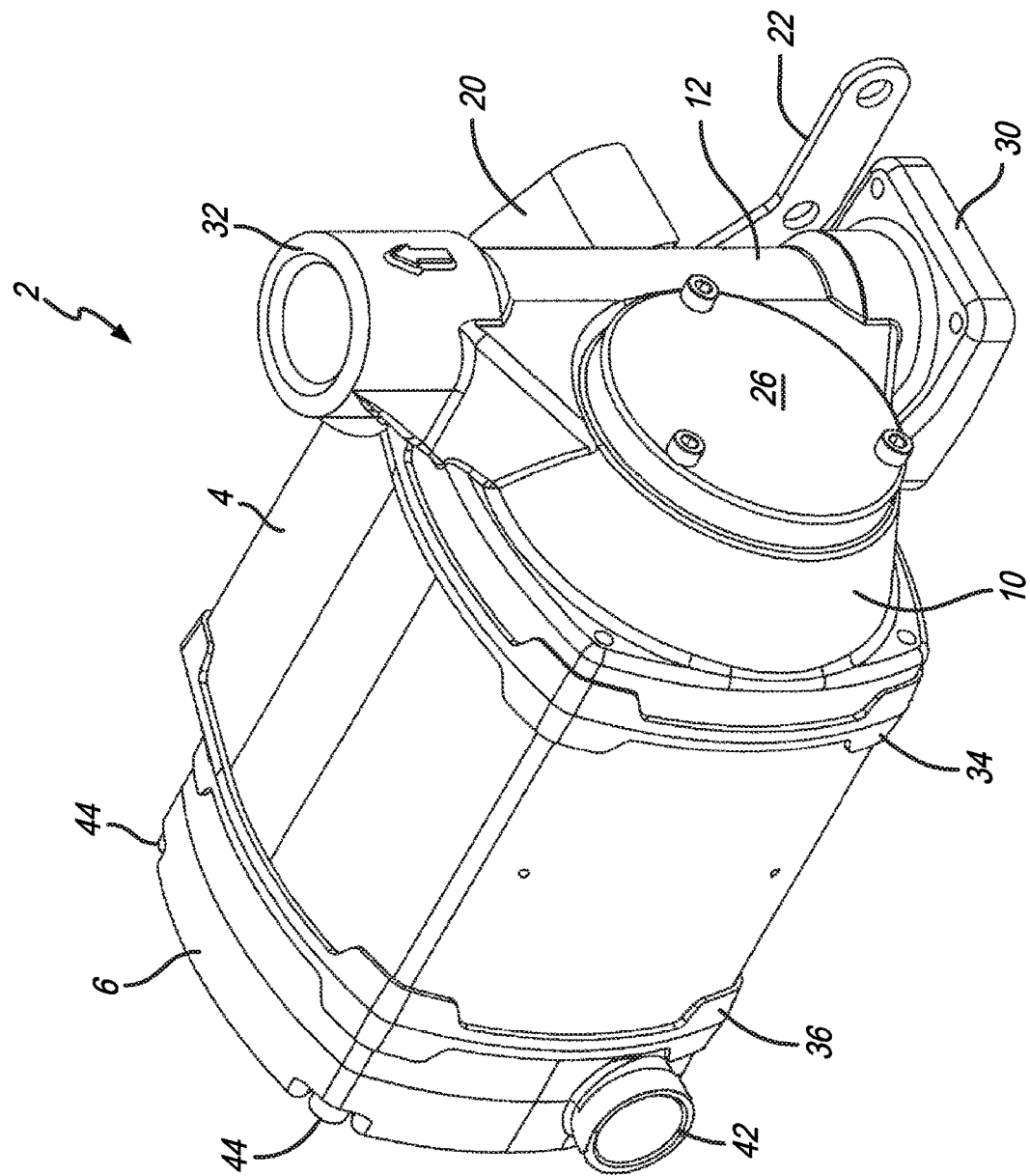
FIG. 2 is a reverse perspective view of the fluid pump assembly.

A reverse perspective view of fluid transfer pump 2 is shown in FIG. 2. This view also shows motor enclosure 4, rear end bell 6, pump enclosure 10, and manifold 12. Particularly depicted is the power supply port 42 through which a power cord enters to connect the power converter in motor enclosure 4 with an exterior power supply, such as a vehicle battery, AC mains, etc.

It will be appreciated by the skilled artisan upon reading this disclosure that the primary components that make up the exterior body of fluid transfer pump 2 are the motor enclosure 4, rear end bell 6, and pump enclosure 10. Manifold 12 is indeed part of pump enclosure 10. It is further appreciated that rear end bell 6 and pump enclosure 10 may be attached to motor enclosure 4 via fasteners such as fastener 44 as shown. It is appreciated, however, that other attaching or fastening means may be employed with the pump so long as the explosion-proof characteristics, as known in the relevant art, are not compromised by attaching the structures together. An important, albeit known, feature of fluid transfer pumps of the type like fluid transfer pump 2 is that it is specifically designed so that the motor located inside motor enclosure 4 will not produce any flame or explosion that can propagate outside of motor enclosure 4. A conventional way of achieving this is to make sure a flame path exists at each motor enclosure opening.

And illustrative embodiment of the present disclosure provides explosion-proof containment between motor enclosure 4 and rear end bell 6. More specifically, an illustrative embodiment of the present disclosure provides a heat sink mechanism within motor enclosure 4 and rear end bell 6 that is capable of dissipating heat while not requiring additional openings in either the motor enclosure 4 or rear end bell 6 that would require adding more flame paths. In this illustrative embodiment, it is contemplated that the motor for use in this pump may be a brushless motor requiring a power converter.

For pumps such as these, they may be powered through battery power. This means 12-24 volts can be supplied to the pump. With new motor technology, particularly with brushless-type motors, it may be necessary to boost the 12-24 volts up to 120 volts direct current. Accordingly, this may require a two stage power converter to supply the needed power to the motor. A consequence of this power conversion, however, is a substantial increase in heat on the circuit boards located inside enclosure 4.

Dissipating heat from motor components and circuit boards is known. Fans and venting are common means of pulling heat generated by such boards away from the motor. In an explosion-proof motor enclosure environment, fans and venting are not really options, however. Again, how motor enclosures are made explosion-proof is by their ability to extinguish any flames generated by an explosion inside the enclosure through these narrow flame paths located at the joints between connecting enclosure components. Having fans and vents, not only add to the complexity of the pump assembly as a whole, but they end up defeating the ability of motor enclosure 4 to be explosion-proof. In the motor enclosures of the present disclosure (such as motor enclosure 4 with end bell 6) it is even more difficult to create heat dissipation without vents.

Accordingly, illustrative embodiment of this present disclosure provides a heat sink system that can transfer heat from the power conversion circuit board (or other structures) away from the internal structures in a motor enclosure without the use of any fans or venting. In an illustrative embodiment, a heat sink plate may be placed in contact with the circuit board or any other structure that produces heat needing to be removed. The heat sink may be fitted between the interior joint portion of the motor enclosure and the interior joint portion of the rear end bell. In this configuration, the plate is in contact with other heat transfer materials (i.e., metal structures) on opposite sides of the heat sink. This metal to metal contact between the heat sink and both the motor enclosure and rear end bell gives increased surface area contact between structures which allows more heat to dissipate. In addition, having the heat sink sandwiched between the interior joint of the flame path of the enclosure means the heat sink has face-to-face contact for effective heat distribution while at the same time not interfering with the flame path structures or require any venting or fans.

Figure 3:
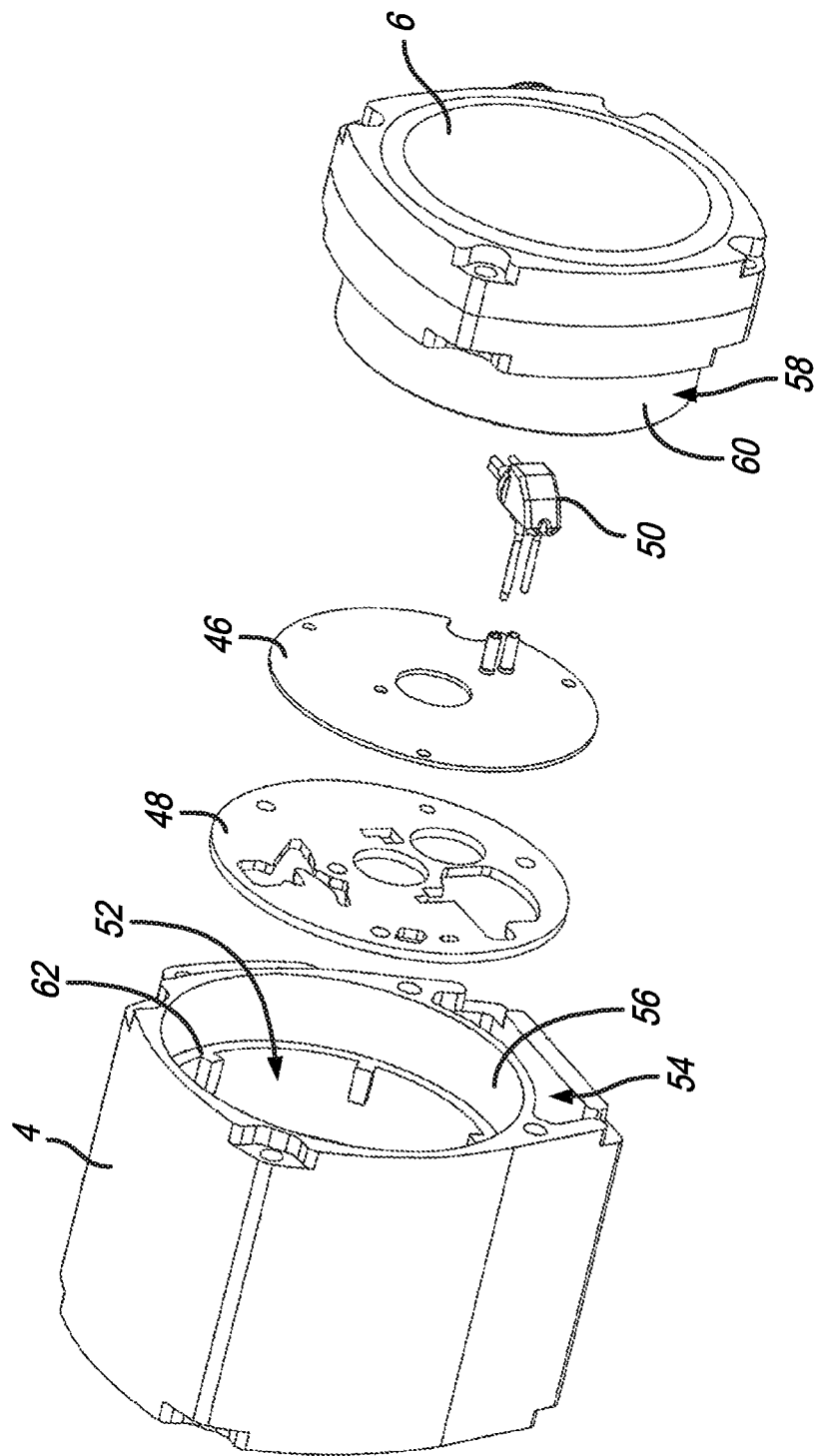
FIG. 3 is a perspective exploded view of the motor enclosure and rear end bell portions, along with selected components to be contained within.

A perspective exploded view of motor enclosure 4 and rear end bell 6 with selected components to be contained within are shown in FIG. 3. Here, a power conversion circuit board 46, heat sink, 48, and plug assembly 50 are shown to be contained within cavity 52 of motor enclosure 4. Also shown in this view is collar 54 that includes an inner periphery that forms a flame path surface 56. Likewise, extending from rear end bell 6 is flange 58 that includes its flame path surface 60 that will be positioned adjacent flame path surface 56 of collar 54. A ledge 62 is formed at the edge of flame path surface 56 and cavity 52 of motor enclosure 4 to serve as an interior joint (see FIG. 4) and a contact surface for heat sink 48. This provides the connection between the two for efficiently transferring heat from heat sink 48, into and through motor enclosure 4 and rear end bell 6.

Figure 4:
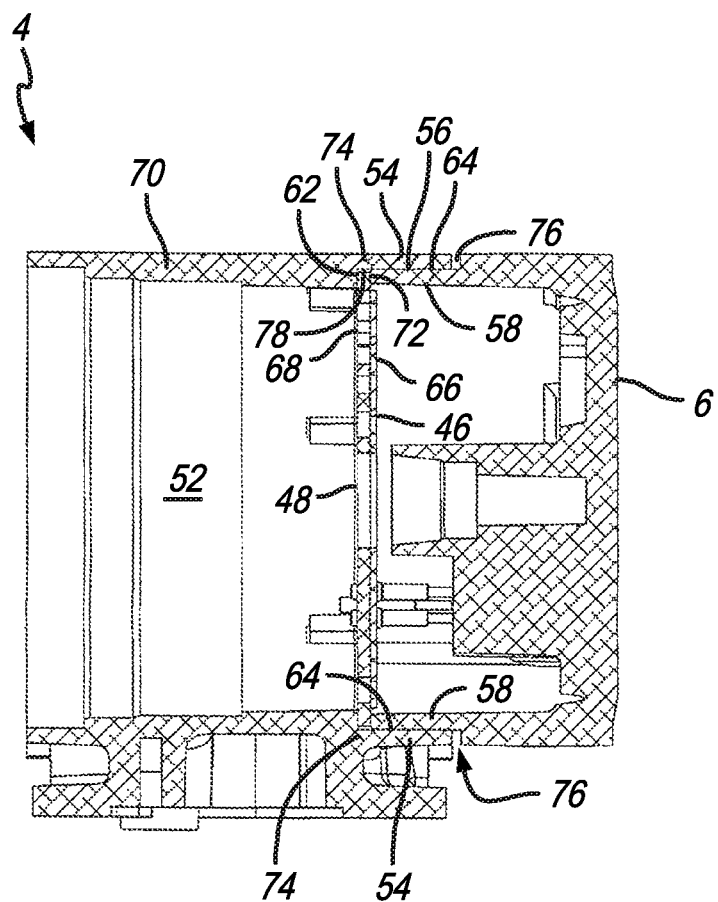
FIG. 4 is a side cross-sectional view of the motor enclosure attached to the rear end bell.

A side cross-sectional view of motor enclosure 4 attached to rear end bell 6 as shown in FIG. 4. This view depicts how heat sink 48 is able to transfer heat that is generated by power conversion circuit board 46 to both motor enclosure 4 and rear end bell 6. As shown, power conversion circuit board 46 is attached to surface 66 of heat sink 48. This substantial contact between the two structures means the heat generated by power conversion circuit board 46 (from power loss during the conversion process) may be effectively transferred into the metal body of heat sink 48. Second surface 68 of heat sink 48 is in contact with ledge 62 interior of motor enclosure 4. The contact between these two surfaces allow the heat that is transferred from power conversion circuit board 46 and into heat sink 48 via first surface 66 to further transfer through contact between ledge 62 and second surface 68 into the heat conductive body 70 of motor enclosure 4. This provides a continuous path for heat to transfer and dissipate through motor enclosure 4. At the same time, first surface 66 of heat sink 48 also engages edge 72, located at the periphery of flange 58 of rear end bell 6. Because rear end bell 6 may also be made of a heat conducting material, the direct contact between edge 72 and first surface 66 provides a second pathway to transfer heat away from power conversion circuit board 46 and through heat sink 48 to rear end bell 6. Furthermore, the contact between heat sink 48, motor enclosure 4 and rear end bell 6 extends the circumference of those structures in cavity 52. Accordingly, heat sink 48 has the availability of all the heat transfer material embodied in both motor enclosure 4 and rear end bell 6 to transfer the heat generated by power conversion circuit board 46.

At the same time, it is notable that heat sink 48 does not interfere with flame path 64 located at the connection of motor enclosure 4 and rear end bell 6. Flame path surfaces 56 and 60 still operate as normal with interior joint 74 still available to receive any combustion despite the presence of heat sink 48 and can extinguish any combustion before reaching exterior joint 76. Accordingly, this configuration allows heat sink 48 to exploit the heat conductive materials of both motor enclosure 4 and heat sink 6 without any need for fans or venting. This configuration also allows the flame path between those two structures to operate as normal. It is notable that a seam still exists between ledge 62 and second surface 68 of heat sink 48 as well as perimeter surface 78 of heat sink 48 and flame path surface 56 of collar portion 54 of motor enclosure 4. This means any ignition that occurs within cavity 52, it can still exit between ledge 62, and second surface 68 and travel between perimeter surface 78, flame path surface 60 and flame path surface 56 before reaching exterior joint 76.

Another illustrative embodiment of the present disclosure is directed to a motor status feedback signal generating system. This system generates status feedback tones within the motor located inside the motor enclosure to convey particular operating conditions of the motor. A circuit board such as circuit board 46 discussed with respect the prior embodiment may include a motor controller. It is appreciated that the status feedback signal may be audible or imperceptible. In an illustrative embodiment, the motor status feedback signal generating system may produce an audio signal that is imperceptible to a human but can be detected by a microphone and processed by a device such as a computer or smart phone to convey the motor status.

The motor controller includes a microprocessor that operates the motor. In other words, the motor controller causes the rotor to rotate. A stator surrounds the rotor and includes a series of opposing pairs of windings. Current is run through these opposing pairs of windings in a concentric manner to create a moving electromagnetic force. A magnet on the rotor is attracted to that moving electromagnetic force. When opposing pairs of windings that surround the rotor are energized in a sequence one after another, they create the moving electromagnetic force around a circle. The magnet on the rotor being attracted to the electromagnetic force chases the moving electromagnetic force thereby causing the rotor to rotate. By increasing or decreasing the amount of current that goes into the windings as well as the rate of the sequence, the motor controller may control the motor's speed.

In the context of a hazardous fluid pump, it is necessary to have an explosion-proof enclosure for the motor to prevent any combustion that occurs within the motor enclosure from causing an explosion exterior of the enclosure. And in order to accomplish this, any openings or joints must have a flame path to extinguish any combustion that occurs within the motor enclosure before it can reach exterior of the motor enclosure. This, as previously discussed, adds complexity and cost to the motor enclosure. It can therefore be necessary to have only a minimum number of openings needed in the motor enclosure to operate the motor. In the case of pump 2, the openings may be limited to the power supply (e.g., power cord) and the motor shaft (not shown). All of the other components of the motor including the motor controller, stator, windings, and any other structural or electronic components are contained within the motor enclosure.

In addition to operating the motor, the motor controller has the capability to monitor the functions of the motor to ensure that it is operating properly, and if not, diagnose the problem. This capability is not uncommon to motor controllers. A motor controller can detect fault conditions with a motor such as over or under voltages, high temperatures, application faults, battery fault, etc. The problem within the context of an explosion-proof motor enclosure is attempting to convey those diagnosed faults to the operator. Using audiovisual indicators such as displays, lights, or external speakers, all require wires to be sent out through the motor enclosure between the motor and the outside environment. To do this requires additional complexity and expense to the pump. This is because an additional flame path will have to be created for each opening. Creating the additional needed flame path may be difficult just to accommodate these wires.

Accordingly, an illustrative embodiment of the present disclosure provides a means for creating an alert scheme to convey operating status of the motor inside the explosion-proof motor enclosure without having to extend any wires or components from the interior to the exterior of the motor enclosure. In this illustrative embodiment, the motor itself may be employed by the motor controller to generate status feedback signals that are perceptible exterior of the motor enclosure and can indicate different status alerts about the motor or application. Allowing the operator to receive feedback without the need to create additional flame paths in the motor enclosure allows for simpler construction while providing enhanced operation of the pump.

Figure 5:
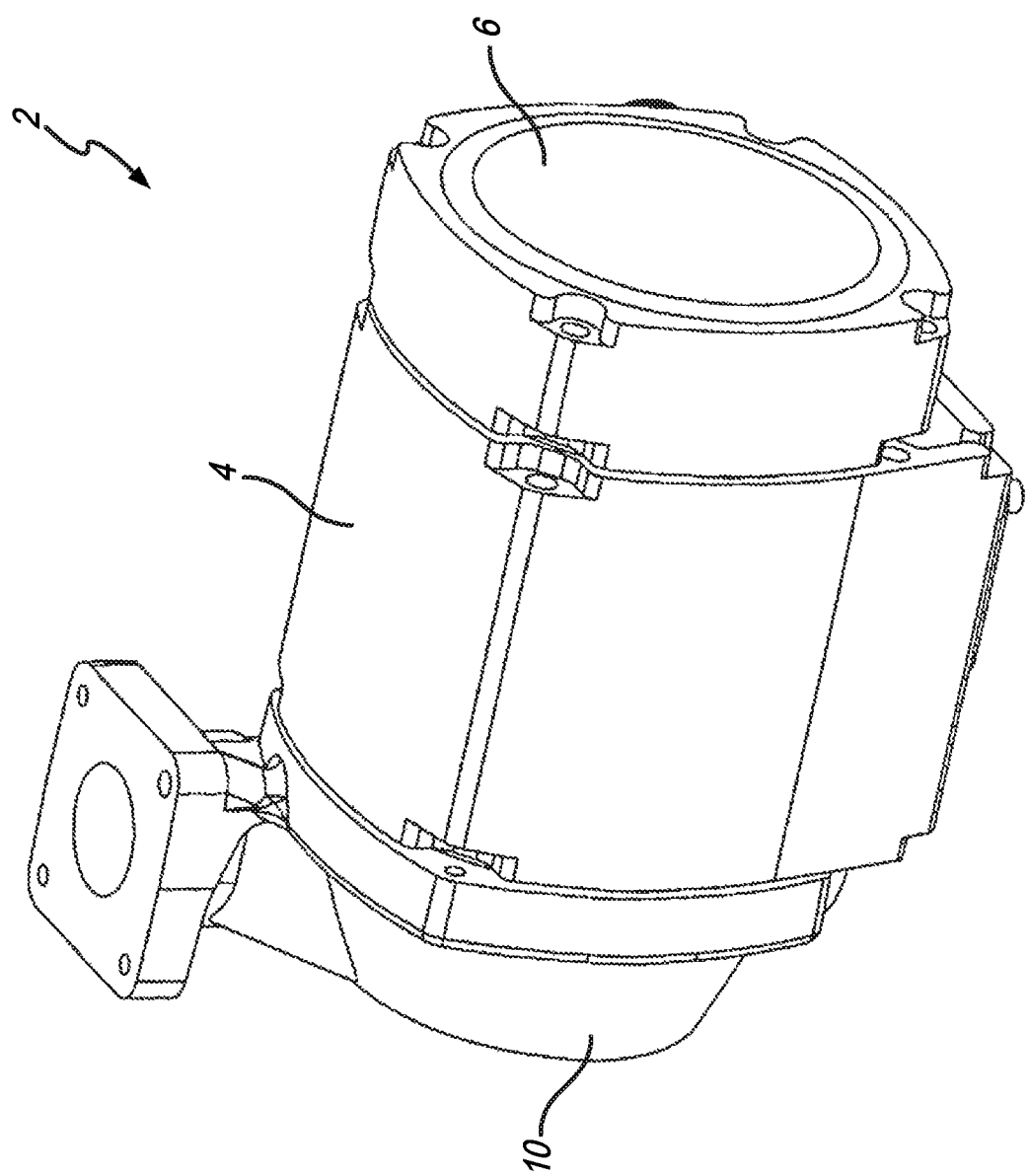
FIG. 5 is a perspective view of the motor enclosure, rear end bell, and pump enclosure portions of the fluid pump assembly.

A perspective view of motor enclosure 4 with rear end bell 6 and pump 2 is shown in FIG. 5. This view demonstrates an explosion-proof pump enclosure where there are no openings. Specifically, motor enclosure 4 and rear end bell 6 do not extend any wires or other structures exterior of same to provide operational feedback to the operator exterior of pump 2. In other words, the motor and its attendant structures are all isolated within motor enclosure 4 while generating status signals that can be perceived exterior of pump 2.

Figure 6:
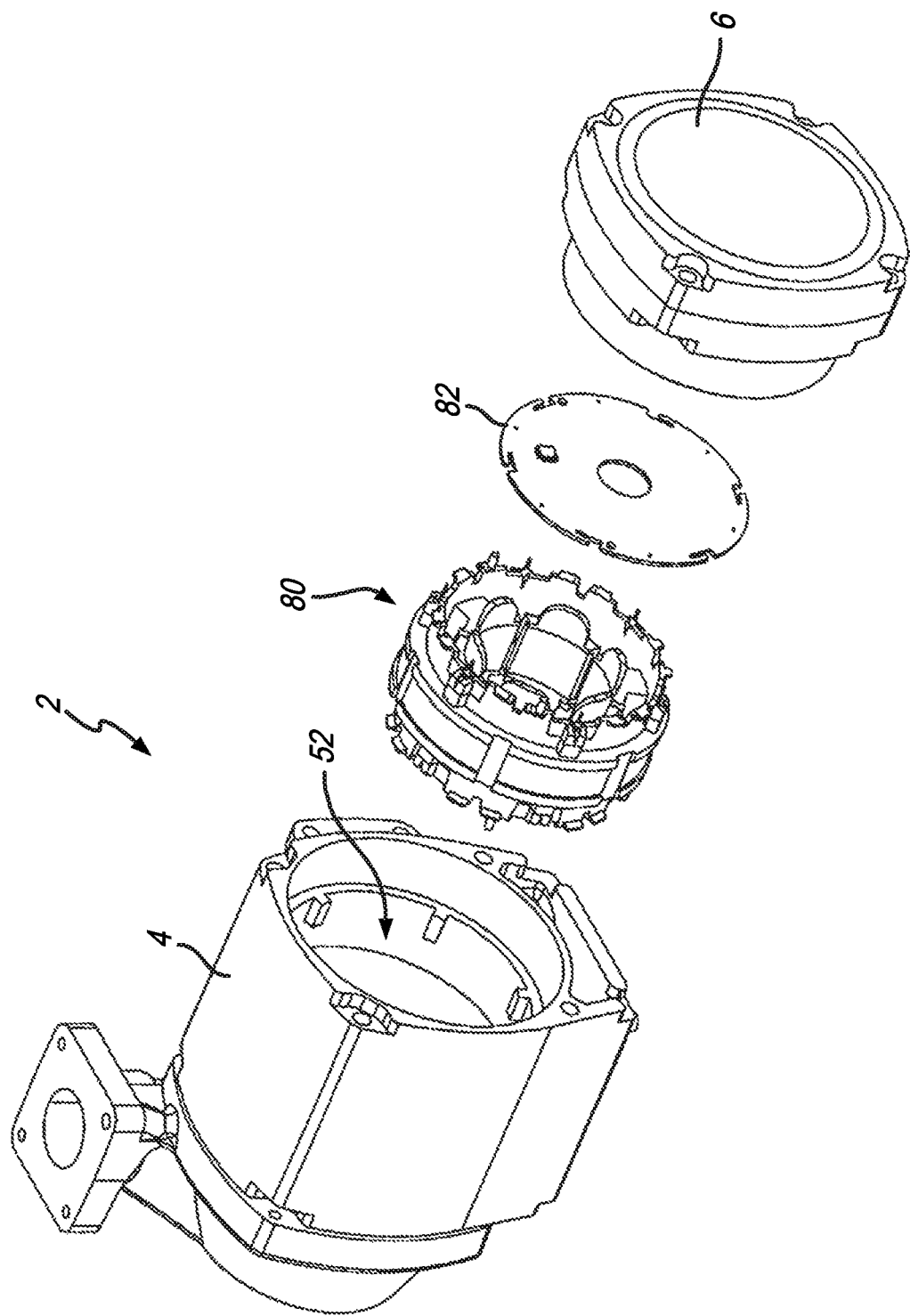
FIG. 6 is an exploded view of the motor enclosure and rear end bell.

An exploded view of motor enclosure 4 and rear end bell 6 is shown in FIG. 6. This view also depicts motor stator portion 80 and motor controller 82. Motor stator portion 80 and motor controller 82 are configured to fit into cavity 52 of motor enclosure 4. This view along with the view of FIG. 5 allows the skilled artisan to appreciate how motor stator portion 80 and motor controller 82 are isolated from exterior of pump 2.

As previously identified, how motor controller 82 operates motor 80 is by supplying current in a sequential fashion to winding pairs that surround the rotor on the stator. To accomplish this, however, requires specific modulated voltages in sequence around the coils of the stator. That said, if the voltage is not sufficient or is sequenced around the stator wire windings improperly, the rotor will not turn. Changing the frequency of the wave form of the current supplied to the motor although not being sufficient to cause the rotor to rotate, will cause the opposing pairs of wires of the stator to vibrate, not unlike piano or guitar wires. The effect of this is a status feedback signal being generated by the motor itself. For example, a motor including motor stator portion 80 in motor enclosure 4 may operate at a PWM (pulse width modulation) frequency of 15,000 hertz. In other words, supplying current to the opposed windings in the stator in a rotational sequence at a rotational frequency of 120 hertz will cause the rotor in the motor to spin and operate the pump. But if 1,500 hertz is supplied to the opposed windings, the rotor will not rotate but will only cause the wires to vibrate producing the status feedback signal.

While the motor is running, the motor controller continuously runs interrupt service routine (ISR) loops to check the status of the motor. If the routine detects a fault preventing the motor 80 from operating properly, motor controller 82 can send an appropriate frequency signal to one or more of the opposed windings on the stator to cause them to vibrate. That resulting status feedback signal will be perceptible by the operator to indicate there is a fault with the motor or application. In addition, the frequency and duration of the vibrating wires may be changed so each of the several varieties of faults can each be assigned a unique tone or tone sequence to convey to the operator the precise type of fault that is occurring with the motor. For example, if an excess temperature fault is detected, motor controller 82 can send an appropriate signal frequency to the motor windings for a period of time, illustratively 0.3 seconds, stop the tone for a second period of time, for example 0.2 seconds, and then repeat. In an almost Morse-code-like fashion, the particular pitch of the tones and durations of same may indicate to the operator that there is a specific fault—such as a high temperature fault. If there is a low battery fault detected, motor controller 82 may produce a unique sequence of tones. These tones may also last for different durations and intervals that will be unique to that specific fault. By hearing this sequence of tone, the operator will know there is a low battery fault.

In an illustrative embodiment, tones are employed to indicate fault conditions. Distinguishing tones may be created by changing the pitch and the number of tones per fault. For example, "application/installation" and "hardware" faults may be identified by sets of tones that are distinguishable by different ordered combinations of high or low pitches. In the illustrative embodiment, the following Tables I and II depict several potential pump, motor, or application fault conditions. The Tables are divided between "application/installation faults" and "hardware faults." The three-tone Table lists "application/installation" faults that identify installation issues related to the pump such as priming or supply voltage, for example. The four-tone Table indicates "hardware" faults which identify conditions outside the operating parameters of the pump such as hardware and motor overtemperatures. As shown in both Tables below, an up arrow "↑" means high tone and a down arrow "↓" means low tone. Illustratively, the tone arrangements may be predetermined so the user will know which fault condition is indicated by listening to the tones generated by the motor inside the enclosure.

TABLE I

Three-Tone Faults (Application/Installation Faults)

| Tones | Condition |
|---|---|
| ↑↓↓ | Low battery voltage (auto shut-off) |
| ↑↓↑ | High battery voltage (auto shut-off) |
| ↓↑↑ | Locked rotor (auto shut-off) |
| ↓↑↓ | Priming/Suction/Lift failure |

TABLE II

4-Tone Faults (Hardware faults)

| Tones | Condition |
|---|---|
| ↓↑↑↑ | Hardware fault (auto shut-off) |
| ↓↑↓↓ | Hardware overtemperature (auto shut-off) |
| ↓↓↑↑ | Motor overtemperature (auto shut-off) |
| ↓↓↑↓ | Motor overvoltage (auto shut-off) |
| ↓↓↓↑ | Motor undervoltage (auto shut-off) |

In Table I, the difference between a low battery voltage fault and a high battery voltage fault is the former is indicated by a three tone signal composed of one high tone and then two successive low tones. In contrast, the high battery voltage fault has a signal that is one high tone, one low tone, and then a high again. For the hardware faults in Table II, a hardware overtemperature fault may include four tones composed of one low tone, one high tone, and then two succeeding low tones. In contrast, a motor overtemperature fault may be composed of two low tones followed by two successive high tones. It will be appreciated by the skilled artisan that any combination of status feedback signal sequences may be used to identify any variety of faults.

By employing precise status feedback signal sequences, not only can the fault types be identified by the operator, but they can also be conveyed to a remote entity. For example, a digital audio recorder, telephone, or phone app may be used to record the sounds and send them to technical support to further diagnose and/or suggest repair options.

Another illustrative embodiment of the present disclosure provides a switch assembly that activates and deactivates the pump motor but without any physical contact with the motor or motor controller. As discussed previously, adding more openings in an explosion proof motor enclosure requires flame paths and special design considerations that add complexity and cost to the pump. Because of this, the fewer openings in the explosion-proof motor enclosure there are the simpler the pump construction and hence, the less expensive it is to manufacture. Typically, many pumps, particularly those dispensing fuels, include a pivoting lever where rotation in one direction activates the pump, and rotation in the reverse direction deactivates the pump.

An illustrative embodiment of the present disclosure includes an on and off switch for the pump motor that is part of the lever, but not part of the motor controller that activates the motor. No part of the switch comes into physical contact with any component of the motor through the motor enclosure. Instead, the switch includes a magnet or magnets that remain exterior of the motor enclosure but are detectible by a magnetic sensor located inside the motor enclosure. The magnets create a magnetic field that passes through the material of the motor enclosure (typically aluminum) and is readable by the sensor inside the enclosure. The sensor itself is in electric communication with the motor controller so that when a magnetic field having particular characteristics is detected by the sensor, it will send a signal to the motor controller to either activate or deactivate the motor. This is all accomplished without any part of the switch physically extending through the motor enclosure wall and contacting the components inside.

Another aspect of an illustrative embodiment of the present disclosure includes the lever assembly having a switch lever mount that may be made of steel, iron, or other like material. This lever mount serves as a shield for the magnet to prevent any operational interference or deliberate attempts to create an alternate magnetic field in order to activate the sensor in the motor enclosure. The magnets on the switch may be located on the shield but opposite the external side of same. In other words, the shield is sandwiched between the switch's lever arm and the actual magnets. This means the magnets will face the motor enclosure while the lever arm faces the exterior environment of the pump assembly.

In a further illustrative embodiment, the sensor is configured to activate the motor only upon detecting a magnetic field having particular characteristics. For example, the internal sensor must detect a magnetic field having a predetermined strength and alignment in order for the sensor to initiate activating the motor. The shield extends laterally or transverse from the magnet(s) so the magnet(s) are uniquely positioned and oriented to produce the requisite strength and (in conjunction with movement by the lever) predetermined alignment to signal to the sensor to either activate or deactivate the pump motor. It is appreciated that in other embodiments, such magnetic switching may be used to activate other internal components within the motor enclosure.

A perspective exploded detail view of components of fluid transfer pump 2 is shown in FIG. 7. Depicted are motor enclosure 4, motor controller circuit board 82, and switch mechanism assembly 8. Within cavity 52 of enclosure 4 is motor stator 80 along with internal magnetic sensor 84. It is appreciated that motor controller circuit board 82 is fitted into cavity 52 of motor enclosure 4 as previously discussed. Shown as part of switch mechanism assembly 8 is illustratively a pair of magnets 86 and 88 to create the magnetic field to be detected by internal magnetic sensor 84. In this illustrative embodiment, two magnets are used so as to create a more complex magnetic field that is more difficult to mimic. It is appreciated, however, that a single magnet or other magnetic schemes may be employed. Such, alternatives serve the same principle as defining a magnetic field having a particular characteristic or characteristics that must be detected by magnetic sensor 84 in order to activate or deactivate any component—particularly the motor—in motor enclosure 4.

Further, depicted herein, is how magnets extend from shield 90. Having magnets 86 and 88 extend from magnet 90 helps particularize the positioning of the magnets relative to the sensor 84 inside motor enclosure 4. This further helps ensure the magnetic field generated by the magnets to ensure only magnets in that particular location will produce the strength needed to be read by the sensor 84. In addition, shield 90 extends beyond the periphery of magnet casing 89, and, thus, magnets 86 and 88 to serve as shielding so either intentional or incidental magnetic fields from the outside environment will not interfere with the magnetic field intending to activate sensor 84.

A top downward looking cross-sectional view of a portion of fluid transfer pump assembly 2 is shown in FIG. 8. This view depicts motor enclosure 4 with motor stator 80 shown housed within cavity 52. Another aspect of motor enclosure 4 is switch recess 92 configured to receive a portion of switch mechanism assembly 8. In particular, switch recess 92 receives magnet casing 89 that holds magnets 86 and 88. A counter sink 94 is illustratively formed on the periphery of switch recess 92 and is configured to receive shield 90 from switch mechanism assembly 8. It is evident from this view how magnets 86 and 88 may be contained in cavity 92 while being shrouded by shield 90. It should be appreciated from this view that cavity 92 and counter sink 94 are formed in the exterior of motor enclosure 4. They do not extend in any way into cavity 52. In other words, switch recess 92 and counter sink 94 are isolated from cavity 52.

A pivot shaft 96, as part of switch shaft assembly 14, is disposed through bore 97 of collar 98 and extends into switch recess 92. Pivot shaft 96 may be secured in bore 97 via fastener 18. Pivot shaft 96 is also attached to magnet casing 89 in order to pivot magnets 86 and 88 (see, also, FIGS. 7 and 9) to move same between activation and deactivation positions.

Figure 9A:
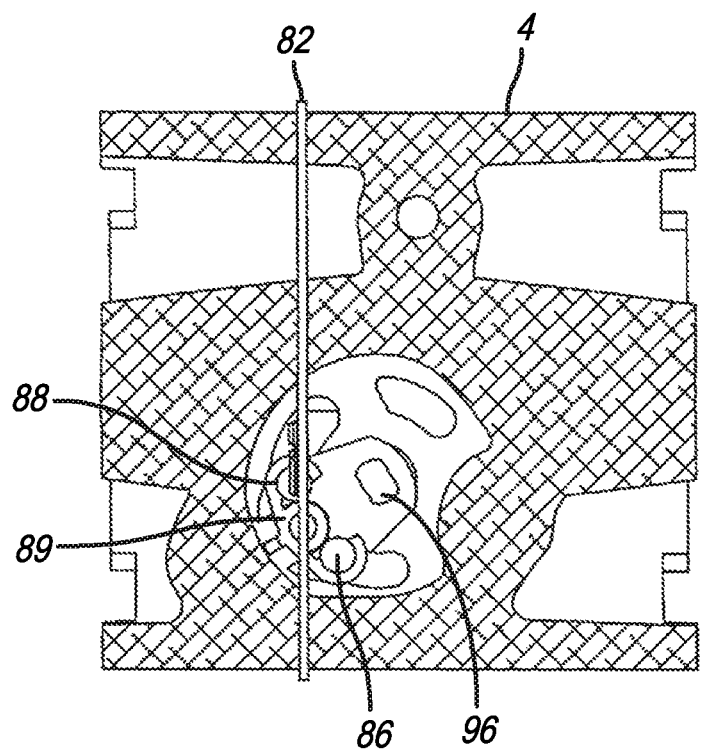
FIGS. 9A and 9B are side cross-sectional views of the motor enclosure and switch mechanism.
Figure 9B:
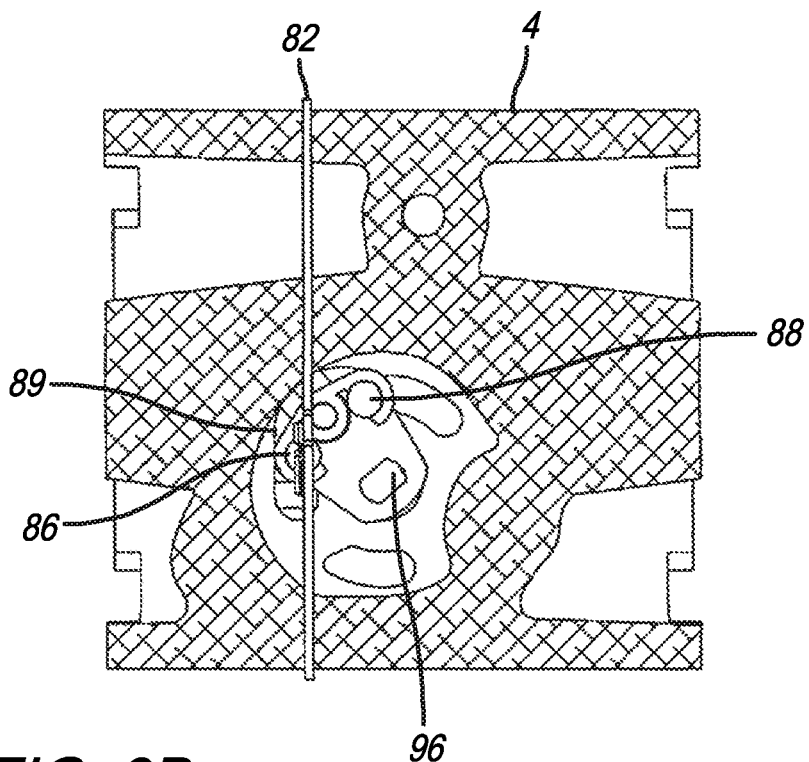

Side cross-sectional views of motor enclosure 4 are shown in FIGS. 9A and 9B. These views depict how magnet casing 89 may be pivoted by pivot shaft 96 in order to move magnets 86 and 88 to create the different characteristics of the magnetic field. Again, it is the different characteristics of the magnetic field that indicate to sensor 84 (see, also, FIG. 7) whether the motor should be activated or deactivated. It is appreciated from these views how the spacing between magnets 86 and 88, as well as their positioning in proximity (see, also, FIGS. 7 and 8), create a unique magnetic field characteristic for sensor 84 to detect. Lastly, motor controller circuit board 82 is also shown in this view.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

The invention claimed is:

1. A fluid transfer pump assembly comprising:
    a motor enclosure assembly formed by a motor enclosure and an end bell;
    wherein the motor enclosure and the end bell join together to form a motor cavity sized to receive a motor;
    wherein the motor enclosure includes a collar that extends from the motor enclosure at a collar base, encircles a portion of the motor cavity, and terminates at a collar end distal from the collar base;

wherein the collar includes a collar surface;

wherein the end bell includes a flange that extends from the end bell at a flange base, encircles a portion of the motor cavity, and terminates at a flange end distal from the flange base;

wherein the flange includes a flange surface;

wherein when the motor enclosure and the end bell are joined together to form the motor cavity, the collar surface faces the flange surface to form a flame path between the collar and flange surfaces;

wherein when the motor enclosure and the end bell are joined together to form the motor cavity the collar base is located adjacent the flange end to form an interior-only joint that faces the motor cavity but not located exterior of the motor enclosure assembly;

wherein when the motor enclosure and the end bell are joined together to form the motor cavity the flange base is located adjacent the collar end to form an exterior-only joint that is located exterior of the motor cavity and does not face the motor cavity;

wherein the flame path extends from the interior-only joint to the exterior-only joint;

a heat sink composed of a panel positionable at the interior-only joint of the motor enclosure assembly;

wherein the panel of the heat sink has a first surface, a perimeter surface, and a second surface such that the second surface is located adjacent the perimeter surface and opposite the first surface; and a heat generating circuit board that is attachable to the panel of the heat sink at a location selected from the group consisting of the first surface and the second surface;

wherein a portion of the first surface of the panel of the heat sink abuts the collar base at the interior-only joint;

wherein a portion of the second surface of the panel of the heat sink abuts the flange end at the interior-only joint; and wherein the perimeter surface of the panel of the heat sink does not interfere with the flame path extending from the interior-only joint to the exterior-only joint of the motor enclosure assembly.

2. The fluid transfer pump assembly of claim 1, wherein the motor cavity is cylindrical, the collar surface of the motor enclosure is cylindrical, and the flange surface of the end bell is cylindrical.

3. The fluid transfer pump assembly of claim 2, wherein the panel of the heat sink has a circular shape such that the perimeter surface of the panel of the heat sink is located adjacent the cylindrical collar surface of the motor enclosure.

4. The fluid transfer pump assembly of claim 1, wherein the panel of the heat sink is located only interior of the motor enclosure assembly wherein no portion of the heat sink extends exterior of the motor enclosure assembly, and wherein no vents in the motor enclosure assembly are configured to dissipate heat from the heat-generating circuit board.

5. The fluid transfer pump assembly of claim 1, further comprising a pump enclosure attached to the motor enclosure assembly.

6. The fluid transfer pump assembly of claim 1, wherein the motor enclosure and end bell are both made of a heat-conducting material.

7. A fluid transfer pump assembly comprising:
a motor enclosure assembly that forms a motor cavity sized to receive a motor;
wherein the motor enclosure includes a flame path composed of a pathway formed by two facing surfaces of the motor enclosure;
wherein the pathway is formed by the two facing surfaces of the motor enclosure that extend from an interior joint to an exterior joint;
wherein the interior joint faces the motor cavity and the exterior joint faces exterior of the motor enclosure assembly; and
a heat sink located in the motor cavity of the motor enclosure assembly;
wherein a portion of the heat sink abuts the interior joint; and
wherein the heat sink does not interfere with the flame path extending from the interior joint to the exterior joint of the motor enclosure assembly.

8. The fluid transfer pump assembly of claim 7, wherein the motor enclosure assembly is composed of a first motor enclosure portion and a second motor enclosure portion.

9. The fluid transfer pump assembly of claim 8, wherein the first motor enclosure portion includes a first facing surface of the two facing surfaces, and the second motor enclosure portion includes a second facing surface of the two facing surfaces.

10. The fluid transfer pump assembly of claim 9, wherein the interior joint includes a first joint surface of the first motor enclosure portion and a second joint surface of the second motor enclosure surface.

11. The fluid transfer pump assembly of claim 10, wherein the portion of the heat sink that abuts the interior joint contacts both the first and second joint surfaces such that heat in the heat sink transfers to the first and second motor enclosure portions.

12. The fluid transfer pump assembly of claim 7, wherein the interior joint encircles the motor cavity, wherein a cross-sectional profile of the motor cavity is circular, square, oval, quadrilateral, and polygonal.

13. The fluid transfer pump assembly of claim 9, wherein the first and second motor enclosure portions are separable.

14. The fluid transfer pump assembly of claim 12, wherein the portion of the heat sink that abuts the interior joint includes a periphery that extends about the perimeter of the heat sink.

15. The fluid transfer pump assembly of claim 14, wherein the periphery abuts the interior joint of the motor enclosure assembly.

16. The fluid transfer pump assembly of claim 7, further comprising a heat generating circuit board is attachable to the heat sink and transfers heat to the heat sink.

17. A fluid transfer pump assembly comprising:
a motor enclosure assembly that forms a motor cavity sized to receive a motor;
wherein the motor enclosure includes a flame path;
wherein the flame path extends from an interior joint to an exterior joint;
wherein the interior joint faces the motor cavity and the exterior joint faces exterior of the motor enclosure assembly; and
a heat sink located in the motor cavity of the motor enclosure assembly;
wherein a portion of the heat sink abuts the interior joint; and
wherein no portion of the heat sink extends exterior to the motor enclosure assembly.

18. The fluid transfer pump assembly of claim 17, wherein the heat sink does not interfere with the flame path that extends from the interior joint to the exterior joint.

19. The fluid transfer pump assembly of claim 17, wherein the motor cavity includes a motor controller that supplies power to a motor having a rotor and a stator, wherein the stator includes a plurality of pole pairs of wire windings that create a moving electromagnetic force to rotate the rotor, wherein the motor controller, upon receiving signals of a condition of the motor, directs current to at least one pole pair of wire windings at a voltage that does not cause the motor to rotate, but causes the at least one pole pair of wire windings to vibrate to create a status feedback signal.

20. The fluid transfer pump assembly of claim 17, wherein the motor cavity includes a switch assembly that comprises at least one magnet located on a shield extending transverse from that magnet, a switch located adjacent to the shield opposite the at least one magnet, wherein the switch is engagable with the magnet through the shield such that as the switch actuator moves the magnet moves, wherein the magnet fits into a space on the motor enclosure that is spaced apart from the motor cavity in the motor enclosure, a magnetic field sensor located inside the motor cavity of the motor enclosure assembly and isolated from exterior of the motor enclosure cavity, wherein the magnetic field sensor is in electric communication with a motor controller to selectively supply current to the motor to operate same, wherein the magnetic field sensor produces a signal when it detects a magnetic field of a predefined characteristic generated by the magnet.

* * * * *